May 6, 1958 — R. FLASKA — 2,833,079
SPINNER FISHING LURE
Filed May 13, 1955
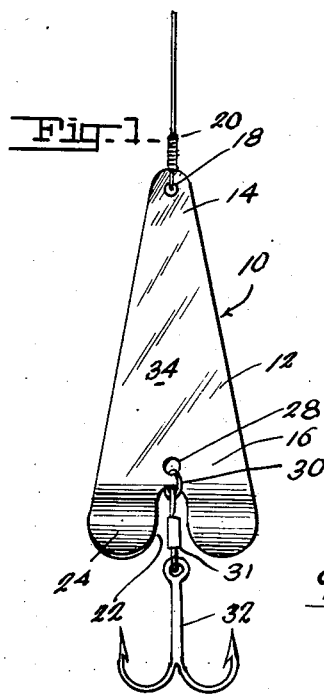
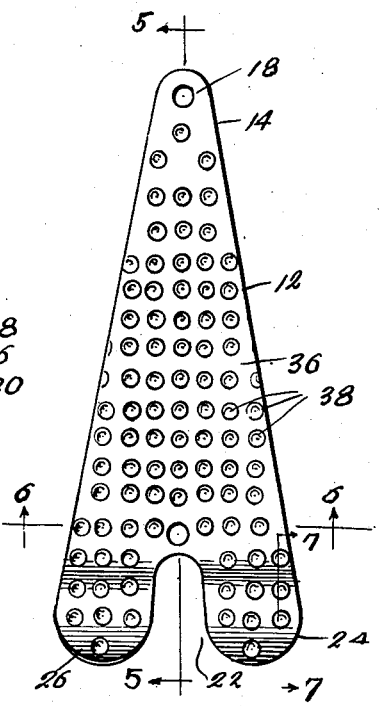
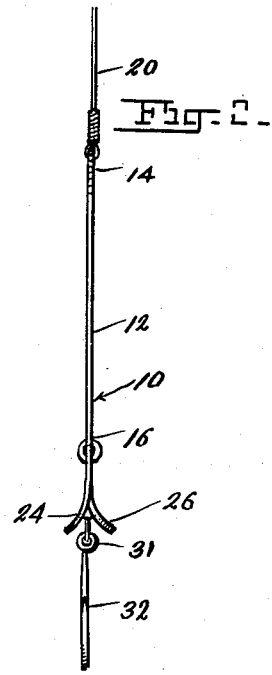
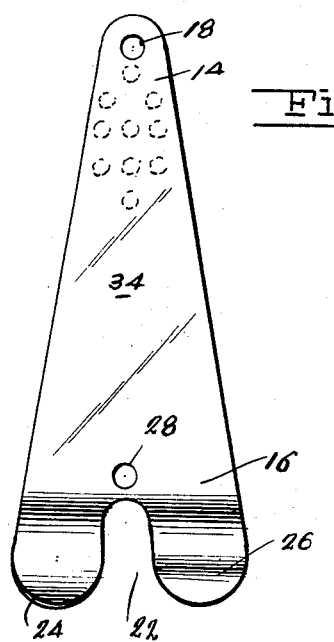
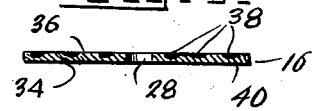
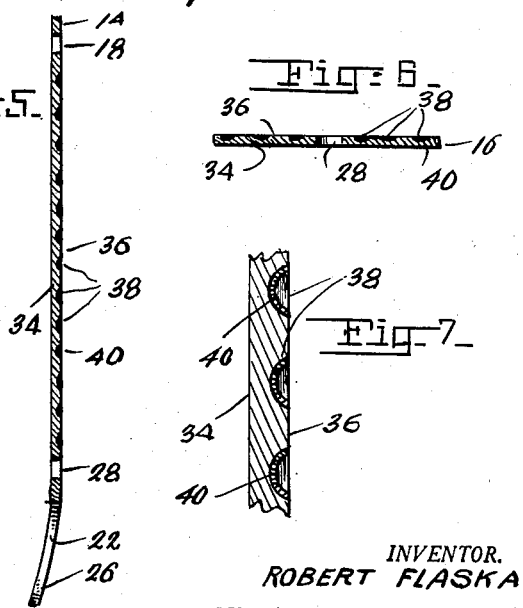
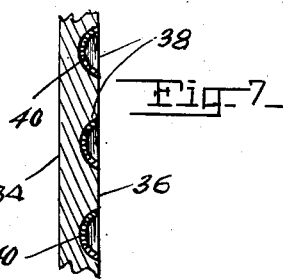
INVENTOR.
ROBERT FLASKA
BY Patrick D. Beavers
ATTORNEY

United States Patent Office 2,833,079
Patented May 6, 1958

2,833,079
SPINNER FISHING LURE
Robert Flaska, Melrose Park, Ill.
Application May 13, 1955, Serial No. 508,154
1 Claim. (Cl. 43—42.34)

This invention relates to fishing lures and is particularly directed to a novel and improved form of lure which is adapted to spin as it is dragged through the water or is contacted in a constant position by the current of the water.

A primary object of this invention is to provide means for spining the lure in a revolving and whipping action to increase its simulation of a fish and to provide colored indentations in one surface of the lure so as to simulate the scales of a small fish, such factors thereby creating a more life-like appearance.

Another object of this invention is to provide a plate having opposing flat surfaces, one of said surfaces being smooth and the other having indentations which are provided in series and have their surfaces colored and disposed below the surface of the plate so that the scales of a fish are simulated thereby; the colored surfaces being below the level of the plate surface so that they will not wear or scratch off.

A further object of this invention is to provide a line, which will stay new looking longer, which is simple and compact and which is inexpensive in construction and use. These and ancillary objects are attained by this invention, the preferred form of which is set forth in the following description and illustrated in the attached drawing, wherein;

Figure 1 is a plan view of the lure in its operational environment;

Figure 2 is a side elevational view of the lure;

Figure 3 is an enlarged plan view of one side or surface of the lure;

Figure 4 is an enlarged plan view of the other side or surface of the lure;

Figure 5 is a longitudinal sectional view taken on line 5—5 of Figure 3;

Figure 6 is a cross-sectional view taken on line 6—6 of Figure 3, and,

Figure 7 is an enlarged fragmentary sectional view taken on line 7—7 of Figure 3.

Referring now more particularly to the drawing, the lure 10 includes a flat plate 12 which is substantially triangular in plan view and has a rounded minor end 14 and a major end 16. The minor end 14 is formed with an opening 18 to receive the fishing line leader 20. The major end 16 is provided with a central, longitudinal cut-out 22 that opens through the rear edge thereof and defines side by side, spaced fins 24 and 26. The fins have rounded outer ends and are bent transversely of the plate at their inner ends and angularly projected in opposite directions from the plate. The rear end, inwardly of the cut-out 22, is provided with an opening 28 to receive a ring 30 which attaches, through a snap connection 31, a treble hook 32 to the plate.

The plate is provided with a flat, smooth surface or side 34, shown in Figure 4, and with an opposing flat surface 36, shown in Figure 3. The surface 36 is provided with a series of indentations 38, shown in detail in Figure 7. The indentations have concave surfaces which are coated with a suitable coloring and surfacing materail, such as paint. The coatings 40 lie below the plane or level of the surface 36 so that they will not be scratched or marred and will not be subject to wear and simulate the scales of a small live fish. Both of the surfaces, after the indentations are painted, are chrome plated and polished to make them long lasting.

It can be seen that in use, the fins will produce a revolving and whipping action of the plate and that the colored indentations 38 will reflect light and appear, during the movement of the plate, as scales on a small fish.

While the best known form of my invention has been shown and described, other forms may be realized as come within the scope of the invention, defined by the appended claim.

I claim:

A spinner fishing lure comprising a flat plate of substanitally triangular planar form and having a minor front end and a major rear end, said front end having means for attaching the plate to a fishing line leader, said rear end having a longitudinal, central cut-out opening through its rear edge to provide two spaced fins, said fins being bent transversely of the plate at their inner ends in opposite directions, means provided in the rear end between the fins for receiving a hook, said plate having opposing flat surfaces, one of said surfaces being smooth and the other having a series of indentations, said indentations having colored surfaces below the plane of the said other surface.

References Cited in the file of this patent
UNITED STATES PATENTS

| 341,954 | Skinner | May 18, 1886 |
| 967,660 | Pedersen | Aug. 16, 1910 |
| 1,095,288 | Rosenberg | May 6, 1914 |
| 1,692,222 | Pagin | Nov. 20, 1928 |
| 2,117,206 | Neff | May 10, 1938 |
| 2,192,563 | Starkey | Mar. 5, 1940 |
| 2,503,607 | Arff | Apr. 11, 1950 |

FOREIGN PATENTS

| 110,625 | Sweden | May 16, 1944 |